United States Patent [19]

Etoh et al.

[11] Patent Number: 4,963,712
[45] Date of Patent: Oct. 16, 1990

[54] SPOT WELDER

[75] Inventors: Hideyuki Etoh, Kobe; Kozo Shida, Miki; Toshiyuki Tange, Kobe; Yoshio Shiotani, Kohsai, all of Japan

[73] Assignee: Kawasaki Jukogyo Kabushiki Kaisha, Kobe, Japan

[21] Appl. No.: 395,774

[22] Filed: Aug. 18, 1989

[30] Foreign Application Priority Data

Sep. 20, 1988 [JP] Japan .......................... 63-123120[U]

[51] Int. Cl.$^5$ .............................................. B23K 11/10
[52] U.S. Cl. ..................................... 219/86.9; 219/86.7
[58] Field of Search ............... 219/861, 87, 86.9, 86.7, 219/91.2

[56] References Cited

U.S. PATENT DOCUMENTS 3,415,973 12/1968 Verbeck ............................ 219/91.2

FOREIGN PATENT DOCUMENTS 60-49877 3/1985 Japan .
60-68179 4/1985 Japan .
452457 4/1975 U.S.S.R. ........................... 219/86.25
1018873 2/1966 United Kingdom ............... 219/86.9

OTHER PUBLICATIONS

Converter Power Supplies, by Chet Shira, Title: Welding Design & Fabrication, 6/85, p. 52.
Kawasaki Heavy Industries Technical Review No. 100, published Aug., 1988.

*Primary Examiner*—Clifford C. Shaw
*Attorney, Agent, or Firm*—Marshall, O'Toole, Gerstein, Murray & Bicknell

[57] ABSTRACT

A spot welder comprising a movable truck which is movable along a workpiece, and first, second and third electrodes supported on the truck. The first and second electrodes are adapted to pair with each other for series welding, and one of the first and second electrodes is adapted to pair with the third electrode for indirect welding. Depending on the state of the site of the weld, welding can be performed by selectively using either series or indirect-spot welding. Mechanisms are provided for easily and rapidly switching between the two welding types.

6 Claims, 4 Drawing Sheets

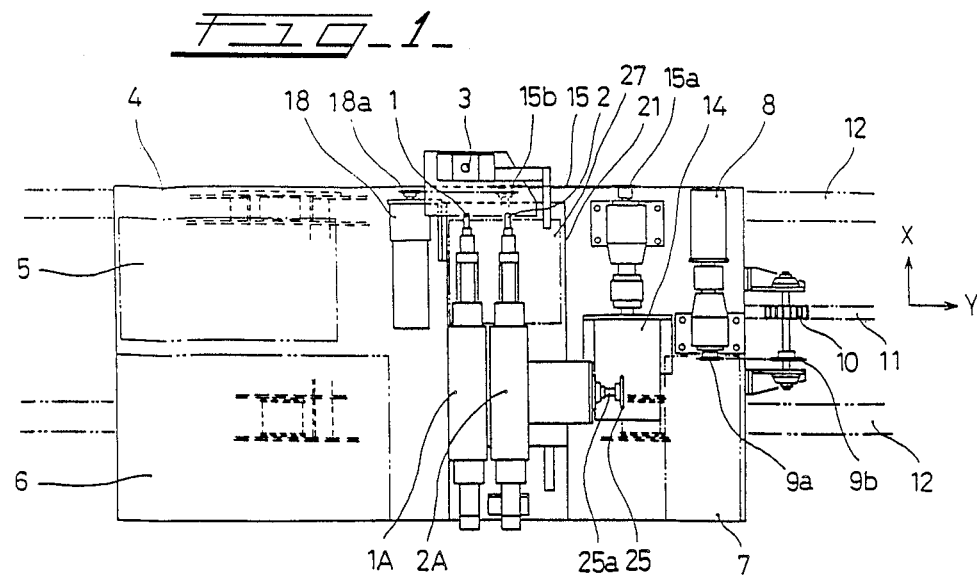
FIG_1_
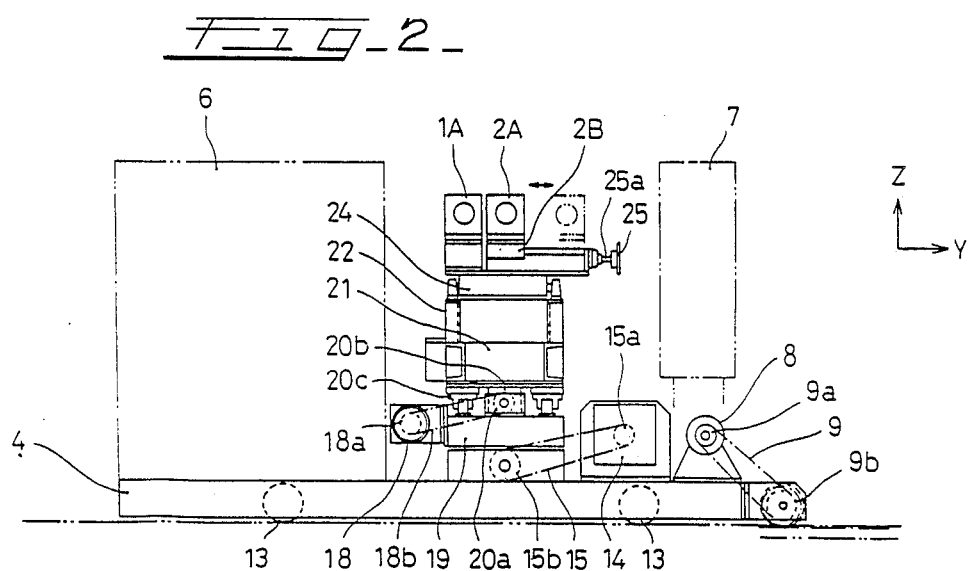
FIG_2_

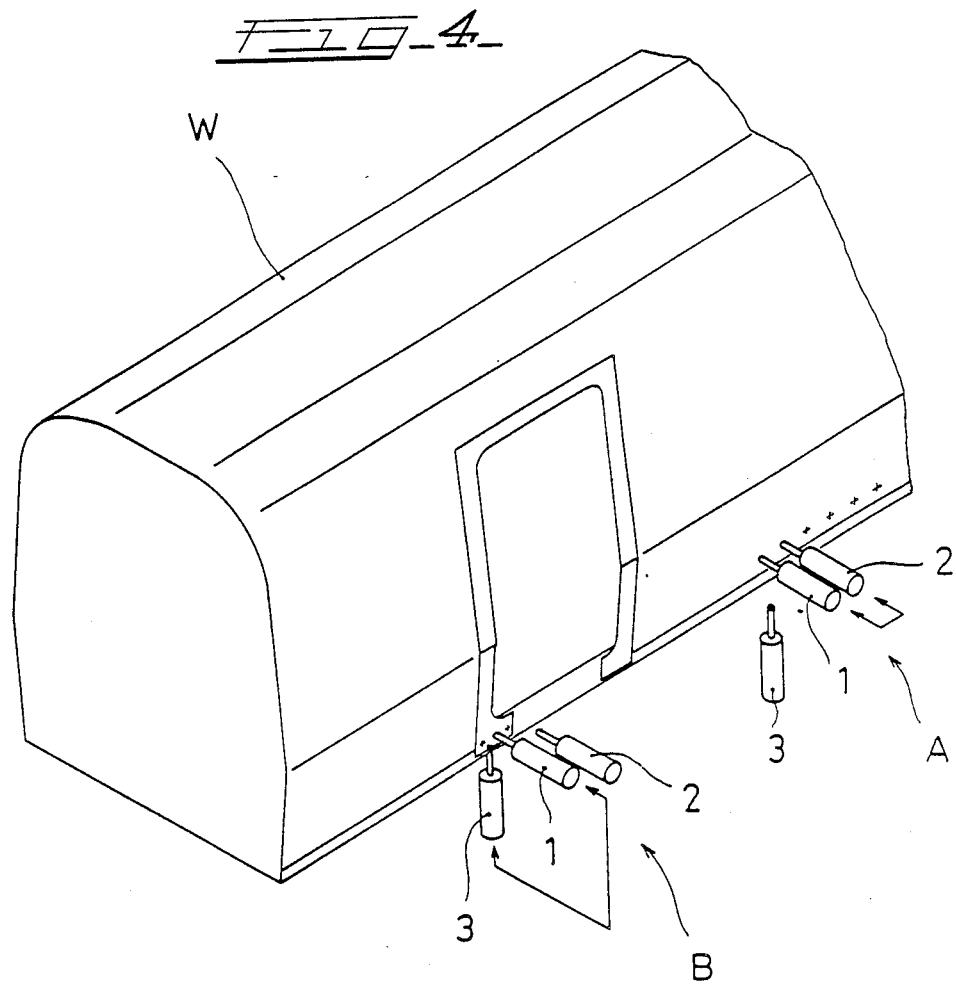

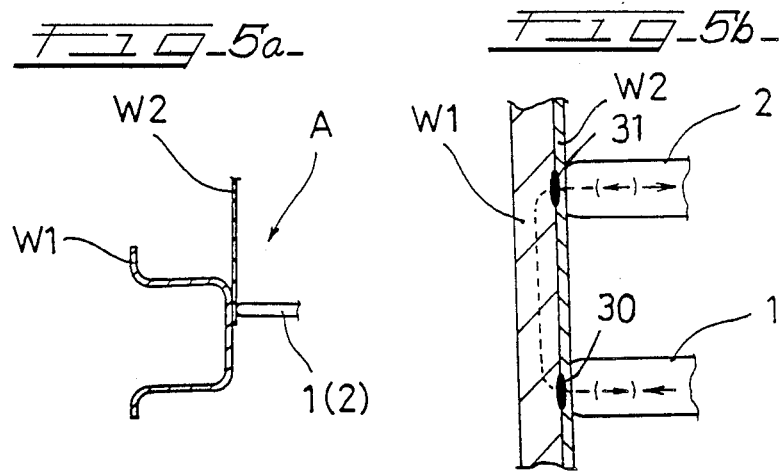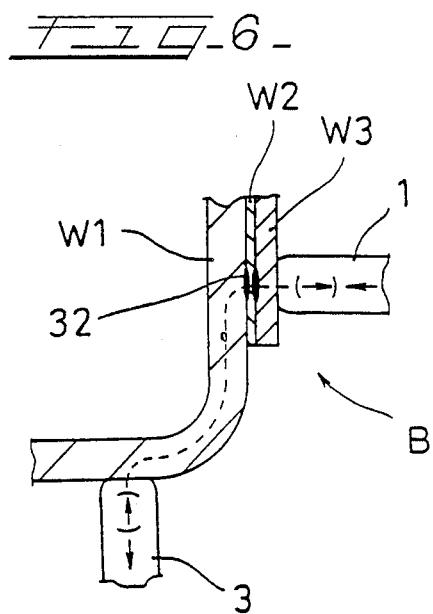

SPOT WELDER

FIELD AND BACKGROUND OF THE INVENTION

The present invention relates to a spot welding machine, and more particularly to a machine for both series and indirect spot-welding and is particularly useful in the assembly/manufacture of railway vehicles, etc.

In recent years, in order to make train coaches lighter and improve their quality, the manufacture of vehicles made of stainless-steel and aluminum-alloy metals, instead of ordinary steel, has been on a rapid increase.

A railway vehicle comprises blocks which are fastened together, namely, an underframe (floor), sides, ends, and a roof. The basic structure of each block consists of a reinforced panel comprising a parallel-cross frame covered by outer plates. The assembly of railway vehicles, unlike an automobile assembly line, is characterized by the fact that the parts are large and that a wide variety of shapes and structures (combinations of different plate thicknesses) require welding. For this reason, the welding machines used in such assembly have raised a number of problems that have not been resolved in the prior art.

In particular, in the case of stainless-steel railway vehicles, spot welding is employed for the entire assembly of the blocks ranging from the frame to the plates in order to keep welding distortions to a minimum for better appearance as well as to prevent the corrosion resistance inherent in such material from deteriorating. The spot-welding in this case usually is direct spot welding. The quality and performance efficiency of the spot welding process will, therefore, have an influence on the quality and productivity of the vehicles assembled.

Direct spot welding is so designed that a workpiece is held between two electrodes fitted to a spot gun and welded after spots have been predetermined. Because of this, if an electrically non-conductive body (an insulator) or an obstacle like a reinforcement part is present on the back side of the workpiece, or if the material is excessively thick, direct spot welding cannot be put into practice. In such a case, therefore, ring or plug welding (arc welding) is performed. However, in performing such weldings, the need also arises for such associated processes as drilling, bead-grinding, and accessory or final plate addition which results in a reduction in work efficiency and a lower productivity.

On the other hand, if the assembly procedure is modified so that an obstacle is welded later so as to avoid the interference with the spot gun, the work procedure during welding is made harder, and joining the parts thus becomes difficult, leading to a decrease in quality and work efficiency.

If the cross section of a part is large, the size of the spot gun must be correspondingly large, which contributes to a decreased work efficiency resulting from an increase in equipment cost and power consumption and in a lower welding speed.

Under these circumstances, and irrespective of the condition of the welding site, a one side welding device has been required which invariably allows for spot welding from one (the outer) side only. In particular, for such large work as railway vehicles, and in view of specific situations where there is a wide range of combinations of thicknesses of plates involved, the development of a highly productive and high quality spot welding device has been hoped for.

It is a general object of the present invention to provide a spot welding device capable of both series and indirect functions that can be used without exception for spot welding from one side.

SUMMARY OF THE INVENTION

A spot welder according to this invention comprises a movable support or truck which is movable along a workpiece, and first, second and third electrodes supported on the truck. The first and second electrodes are adapted to pair with each other for series welding, and one of the first and second electrodes is adapted to pair with the third electrode for indirect welding.

Depending on the state of the site of the weld, welding can be performed by selectively using either series or indirect-spot welding; this switch-over can easily and rapidly be carried out.

BRIEF DESCRIPTION OF THE DRAWINGS

A preferred embodiment of the present invention is described in detail with reference to the figures of the accompany drawings, wherein:

FIG. 1 is a plan view of a spot welding machine in accordance with the present invention;

FIG. 2 is a side view of the machine;

FIG. 4 is a diagrammatic view illustrating the operation of the present invention; and FIGS. 5a, 5b and 6 are enlarged views of welding operations at sites A and B shown in FIG. 4.

DETAILED DESCRIPTION OF THE DRAWINGS

Figure 3:
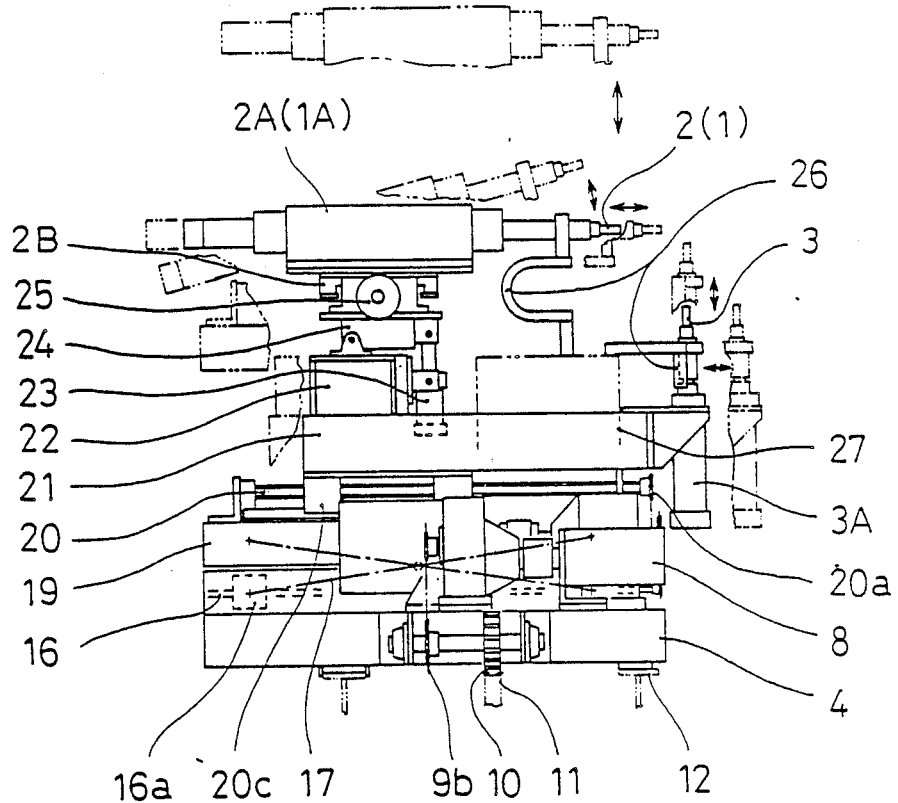
FIG. 3 is a front view of the machine.

First, FIG. 4 shows the conceptual arrangement of the present invention. There are provided three electrodes 1, 2 and 3 which move along a workpiece (work) W such as the body of a railway vehicle. The electrodes 1 and 2, mounted parallel to each other in the same generally horizontal plane, constitute a pair at site A for series-spot welding. At site B near a door mask, the electrode 1 pairs with upright electrode 3 facing it for indirect-spot welding.

In general, series-spot welding is applied to sites where the plate thickness is thin and the number of adjoining plates is small; it is possible to weld two spots 30 and 31 simultaneously during a single resistance welding (see FIG. 5). Meanwhile, indirect-spot welding is employed in sites where there are a number of thick plates, which enables spotwelding of one point or spot 32 during a single resistance welding (see FIG. 6).

For example, as illustrated in FIG. 5, if there is a combination of a side beam W1 6 mm thick, and an outer panel W2 1.5 mm thick, the electrodes 1 and 2 perform serial spot welding at the spots 1a and 2a which are spaced in a longitudinal direction with respect to the workpiece W, and this operation may be repeated at constant intervals.

Meanwhile, as shown in FIG. 6, if there is a combination of a side beam W1 6 mm thick, an outer panel W2 1.5 mm thick, and a door mask W3 3 mm thick, series spot welding is difficult. This is due to a poor weld penetration. For this reason, instead of series-spot welding, indirect-spot welding is performed by the pair of electrodes 1 and 3.

As described above, in connection with a large-scale work, it is preferable to be able to quickly select (or switch to) between series welding and indirect welding depending on the status of the site to be welded.

A machine for accomplishing the foregoing and embodying the present invention is shown in FIGS. 1 to 3. For convenience, the running direction of a movable support 4, referred to herein as a truck, is indicated as the Y axis; the horizontal axis at a right angle with respect to the Y axis is indicated as the X axis, and the vertical axis with respect to the above two axes is indicated as the Z axis.

The spot welding machine is mounted on the truck 4 and runs on rails 12 laid in the direction of the Y axis. Also mounted on the truck is a related hydraulic unit 5, a control board 6, an operation board 7, and so on. Electrodes 1 and 2, which constitute a pair during series-spot welding, face in the direction of the X axis and are placed in parallel in the direction of the Y axis on almost the same plane. Another electrode 3 for indirect-spot welding is installed in the direction of the Z axis and is aligned with the electrode 1. The electrode 1 is so arranged as to act for both series and indirect weldings. All of these three electrodes 1, 2 and 3 are linked to the rod end of compression cylinders 1A, 2A and 3A; each electrode is connected through a U bend conductor 26 to a transformer 27.

A servo-motor 8 for driving the truck 4 is fitted to the front of the truck 8. A pinion 10 meshes with a stationary rack 11 mounted adjacent the rails 12 and extending in the direction Y, and the pinion is supported on the front end of truck 4 to rotate with the servo-motor 8 through a chain-belt 9 (FIG. 2) wound between sprockets 9a and 9b. Since the truck 4 moves along the rack 11 which is in mesh with the pinion 10, it can run at a constant small pitch. This is advantageous so that the interval between spots of spot welding may be determined. Running wheels 13 of the truck move on the rails 12.

In parallel with the servo-motor 8, another servomotor 14 is provided which is a drive for raising (in the direction of the Z axis) the spot-welding parts, that is, the electrodes 1, 2 and 3. A sprocket 15a is fitted to the drive shaft end of this servo-motor 14, and a chain-belt 15 joins this sprocket to another sprocket 15b fitted to the end of a threaded shaft 16 (FIG. 3) extending in the direction X. Onto the threaded shaft 16 is threadedly connected a mobile body 16a which moves along with the shaft 16. One of the legs of a scissors-type elevating means 17 is supported on this mobile body 16a (FIG. 3).

A threaded shaft 20 extending in the direction of the X axis is fitted onto an elevating table 19 mounted on the elevating means 17, and one end is equipped with a sprocket 20a. A chain-belt 18b joins this sprocket to a sprocket 18a of another servo-motor 18 fitted to the side of the elevating table 19. The threaded shaft 20 is provided with a mobile part 20b which is screwed onto this threaded shaft, and a mobile table 21 is placed on this mobile part 20b. A guide rail 20c is placed in the direction of the X axis.

The compression cylinder 3A having the electrode 3 for indirect-spot welding is fixed to one end of this mobile table 21. At the other end of the mobile table 21, an intermediate table 22 is mounted. At a side of this intermediate table 22, a tilting cylinder 23 is provided, and its rod end is connected to one end of a tilting table 24; the other end of this table 24 pivots on the intermediate table 22.

The pair of compression cylinders 1A and 1B carrying the electrodes 1 and 2 for series spot welding are installed on the tilting table 24. The cylinder 1A is fastened to the table 24, but the other cylinder 2A is movable in the direction Y so that the interval or space between the electrodes 1 and 2 can be adjusted; that is, a table 2B for the cylinder 2A is screwed to a wheel shaft 25a so as to allow the table to move in the direction of the Y axis by turning the wheel 25.

Although not shown, a cooling water pipe is connected to each of the electrodes 1, 2 and 3 in order to protect them against overheating. Similarly, a hydraulic tube is coupled from the hydraulic unit 5 to each of the cylinders 1A, 2A, 3A and 23.

A wide variety of motions, as described above, may be performed as instructed from the operation board 7, and the electric control is made at the control board 6.

Considering the operation of the machine, as indicated in FIG. 4, the position of the electrodes is set by driving the servo-motor 8 and thereby running the truck 4 to the side of a workpiece W. At site A, a series-spot welding is performed as described above; that is, both electrodes 1 and 2 are pressed against a work plate by extending the compression cylinders 1A and 2A, and when current is passed between the electrodes 1 and 2 as shown by a dotted line in FIG. 5, two weld sites 30 and 31 are joined by spot welding. Subsequently, the truck 4 is moved slightly and the electrodes are set at the next spot welding position. Spot welding may then be repeated in the same manner as described above. In this way, series-spot welding operations are performed at constant intervals while the truck 4 is moved a little at a time in the direction of the Y axis. In this example, the electrodes 1 and 2 are arranged horizontally; a similar effect can be obtained even when they are vertically displaced, depending on the structure of workpieces. In addition, a wider range of welding operations can be performed if the electrode 3 is so designed as to be tilted. During series-spot welding, the electrode 3 for indirect welding does not come into contact with the work W since the rod end of its cylinder 3A has been shortened or withdrawn.

As described above, series-spot welding should not be performed in situations where the welding machine moves to the spot welding position on the door mask at such as at site B, illustrated in FIG. 4. Therefore, while keeping the electrode 2 for series welding spaced away from the work W, the electrode 1 and the electrode 3 for indirect welding are pressed against the surface of the workpiece by actuating the compression cylinders 1A and 3A. Then, as indicated by a dotted line in FIG. 6, current is passed between the electrodes 1 and 3 to perform indirect spot welding at the weld sites 32.

When such large works as road vehicles are welded, the weld sites may vary widely. In order to weld such widely varying sites, the tilting cylinder 23 (FIG. 3) may be actuated to tilt the electrodes 1 and 2, and the elevating means 17 is actuated to move the electrodes 1, 2 and 3 in the vertical direction of the Z axis, as shown in FIG. 3; of course, the electrodes 1, 2 and 3 may also be so constructed as to move independently of each other, whereby a much wider variety of workpieces can be welded. In order to change the interval of punches, or the space between the electrodes, the wheel 25 is manipulated to move the electrode 2 in the direction of the Y axis. Means may also be provided to move this electrode 2 in the direction of the X axis.

An inverter may be employed as part of a power source unit to modify the current by changing the frequency, whereby a stabilized welding current is obtained and quality spot welds can be produced. In such a power source, the AC voltage at the power line frequency is connected to a converter which converts from AC to a DC voltage. The inverter is connected to receive the DC voltage and produce an AC voltage at the desired frequency which produces quality welds.

As described above, the present invention provides the following advantageous effects:

(1) Since the current flow is from one side, push and welding can be performed irrespective of the complexity of the structures, the non-conductivity of some of the materials, and the coated portions on the back of workpieces.

(2) The single welding machine for both series and indirect spot weldings allows for rapid spot welding for a wide variety of vehicles and various combinations of workpieces. Furthermore, this device permits easy and rapid switch-over from one welding procedure to another, thereby facilitating the automation of the welding procedures.

Consequently, the number of welders can be reduced, and the productivity can be improved.

(3) The sites to be ring- or plug-welded are eliminated, resulting in a reduction in the number of processes. At the same time, the number of distortions is reduced, and consequently the welded workpieces present a better finish.

What is claimed is:

1. A spot welder comprising a truck which is movable relative to a workpiece, first, second and third electrodes supported on said truck, said first and second electrodes being adapted to pair with each other for series welding, and one of said first and second electrodes being adapted to pair with said third electrode for indirect welding, means on said truck and connected to said first, second and third electrodes for moving only a selected two of said electrodes against said workpiece at one time, and a power source connected to said first, second and third electrodes for powering only said selected two electrodes at a time.

2. A spot welder according to claim 1, wherein said first and second electrodes are arranged in a substantially horizontal row.

3. A spot welder according to claim 2, wherein said third electrode is displaced vertically from said first and second electrodes.

4. A spot welder according to claim 1, wherein said first and second electrodes are arranged in a substantially vertical row.

5. A spot welder according to claim 1, and further including means for switching between series welding and indirect welding.

6. A spot welder according to claim 1, wherein said power source includes an inverter connected to said electrodes.

* * * * *